E. W. Tilton,
Saw.
Nº 63,581. Patented Apr. 2, 1867.

Witnesses
Theo Tusche
Wm Travrn

Inventor
E W Tilton
Per Munn
Attorneys

United States Patent Office

E. W. TILTON, OF OSHKOSH, WISCONSIN.

Letters Patent No. 63,581, dated April 2, 1867.

IMPROVEMENT IN SAWS.

*The Schedule referred to in these Letters Patent and making part of the same.*

TO ALL WHOM IT MAY CONCERN:

Be it known that I, E. W. TILTON, of Oshkosh, in the county of Winnebago, and State of Wisconsin, have invented a new and useful Improvement in Saws; and I do hereby declare that the following is a full, clear, and exact description thereof, which will enable others skilled in the art to make and use the same, reference being had to the accompanying drawings, forming part of this specification.

This invention relates to the manner in which an upright or horizontal saw is made to saw circular forms, such as felloes for wagon-wheels, or other circular bodies, staves for barrels, and all work of that description; and the invention consists in forming the blade of the saw concave, so as to suit the circle to be sawed.

Similar letters of reference indicate like parts.

Figure 3:
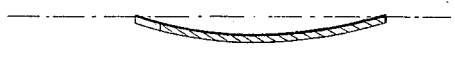
Figure 3 represents another cross-section, the blade being formed more concave, as when the saw is designed to saw smaller circles.
Figure 2:
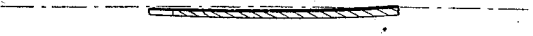
Figure 2 represents the blade in cross-section, as through the line $y\,y$ of fig. 1, and formed slightly concave.
Figure 1:
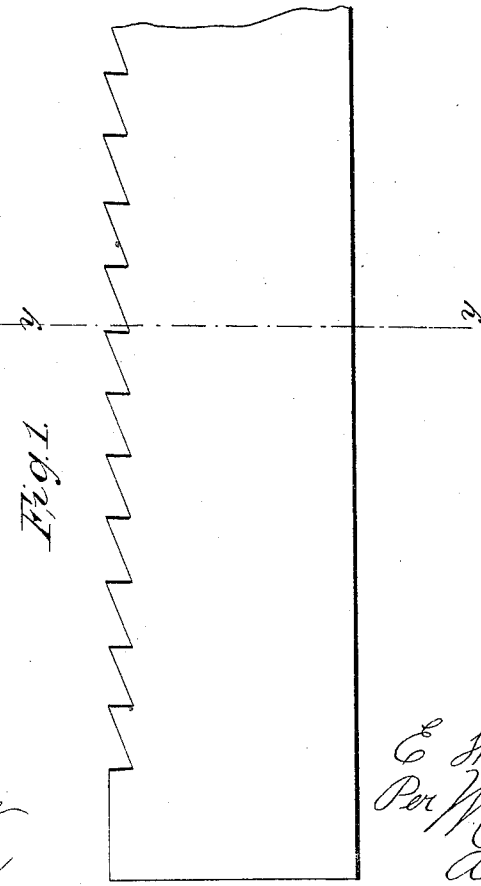
Figure 1 represents a side view of a saw-blade, which, in this view, appears the same as an ordinary straight saw-blade.

These saws are placed in a gate or frame in the manner the same or similar to the ordinary mill-saw; and in sawing felloes or staves, or other work of a similar nature, they may be placed in gangs, so that a number of pieces may be sawed at the same time.

What I claim, and desire to secure by Letters Patent, is—

Forming a saw concave, substantially in the manner herein shown and described for the purposes specified.

E. W. TILTON.

Witnesses:
   A. METZ,
   F. METZ.